United States Patent
Aue et al.

(10) Patent No.: US 9,832,038 B2
(45) Date of Patent: Nov. 28, 2017

(54) COMMUNICATION SYSTEM HAVING A CAN BUS AND A METHOD FOR OPERATING SUCH A COMMUNICATION SYSTEM

(75) Inventors: Axel Aue, Muenchingen (DE); Martin Gruenewald, Vaihingen/Enz (DE)

(73) Assignee: ROBERT BOSCH GMBH, Stuttgart (DE)

(*) Notice: Subject to any disclaimer, the term of this patent is extended or adjusted under 35 U.S.C. 154(b) by 1611 days.

(21) Appl. No.: 12/674,960

(22) PCT Filed: Oct. 20, 2008

(86) PCT No.: PCT/EP2008/064131
§ 371 (c)(1),
(2), (4) Date: Feb. 24, 2010

(87) PCT Pub. No.: WO2009/053332
PCT Pub. Date: Apr. 30, 2009

(65) Prior Publication Data
US 2011/0125940 A1    May 26, 2011

(30) Foreign Application Priority Data
Oct. 26, 2007    (DE) .......................... 10 2007 051 657

(51) Int. Cl.
G06F 13/42    (2006.01)
H04L 12/40    (2006.01)

(52) U.S. Cl.
CPC .................. *H04L 12/40032* (2013.01); *H04L 2012/40215* (2013.01)

(58) Field of Classification Search
USPC ................ 710/104, 105, 117, 124, 305, 316, 710/240–244; 701/29; 370/360, 362,
(Continued)

(56) References Cited

U.S. PATENT DOCUMENTS 6,151,640 A * 11/2000 Buda et al. ..................... 710/11
7,299,098 B2    11/2007 Gruenewald et al.
(Continued)

FOREIGN PATENT DOCUMENTS

DE    10153085    5/2003
DE    10301899    7/2004
(Continued)

OTHER PUBLICATIONS

Comparison of Event-Triggered and Time-Triggered Concepts with Regard to Distributed Control Systems, Amos Albert, 2004.*
(Continued)

*Primary Examiner* — Faisal M Zaman
(74) *Attorney, Agent, or Firm* — Norton Rose Fulbright US LLP; Gerard Messina

(57) ABSTRACT

A communication system and a method for operating a communication system, the communication system having a CAN bus and at least two devices connected with the aid of the CAN bus. Such a device has a CAN control unit, an asynchronous, serial communication (ASC) interface unit, and a switch. The CAN control unit is suitable for transmitting, in a first transmission mode, CAN data frames over the CAN bus with the aid of a first physical protocol. The asynchronous, serial communication interface unit or ASC interface unit is suitable for transmitting, in a second transmission mode, ASC data frames over the CAN bus with the aid of a second physical protocol. The switch is designed for switching over between the first transmission mode and the second transmission mode as a function of at least one agreement effective between the device and at least one other device.

19 Claims, 3 Drawing Sheets

(58) Field of Classification Search
USPC .......................................................... 370/364
See application file for complete search history.

(56) References Cited

U.S. PATENT DOCUMENTS

| | | | |
|---|---|---|---|
| 7,363,129 B1* | 4/2008 | Barnicle et al. ................... 701/1 |
| 7,617,330 B2* | 11/2009 | Ellerbrock ............ G06F 13/385 709/220 |
| 7,934,039 B2* | 4/2011 | Fredriksson et al. ......... 710/305 |
| 7,949,811 B2* | 5/2011 | Fuehrer ............... H04L 12/4015 710/107 |
| 8,065,464 B2* | 11/2011 | Aue ............................... 710/316 |
| 2003/0100980 A1 | 5/2003 | Gruenewald et al. |
| 2003/0135622 A1* | 7/2003 | Anderson et al. ............. 709/227 |
| 2005/0066062 A1* | 3/2005 | Hartwich ............. G05B 19/042 710/1 |
| 2006/0142914 A1* | 6/2006 | Yokogawa ........... G07C 5/0858 701/33.4 |
| 2006/0143345 A1* | 6/2006 | Fredriksson ........ G06F 13/3625 710/106 |
| 2006/0171410 A1* | 8/2006 | Jung ................. H04L 12/40143 370/447 |
| 2007/0286225 A1* | 12/2007 | Enders et al. ................. 370/438 |
| 2009/0144587 A1* | 6/2009 | Barrenscheen et al. ......... 714/40 |
| 2010/0064082 A1* | 3/2010 | Ihle .................. H04L 12/40013 710/106 |
| 2010/0211711 A1* | 8/2010 | Kuschke et al. .............. 710/110 |
| 2010/0229046 A1* | 9/2010 | Fuehrer .................. G06F 9/546 714/43 |
| 2010/0293311 A1* | 11/2010 | Hahn ............................ 710/107 |
| 2010/0293315 A1* | 11/2010 | Hartwich ...................... 710/305 |
| 2011/0093632 A1* | 4/2011 | Aue .............................. 710/105 |
| 2011/0125923 A1* | 5/2011 | Fredriksson et al. ......... 709/246 |

FOREIGN PATENT DOCUMENTS

| | | |
|---|---|---|
| JP | 2003-162303 | 6/2003 |
| JP | 2008-521705 | 6/2008 |
| WO | WO 02/46938 | 6/2002 |
| WO | WO 2005/081463 | 9/2005 |
| WO | WO 2006/059285 | 6/2006 |

OTHER PUBLICATIONS

Special Programming/Forming Data Packets, Wikibooks, <https://en.wikibooks.org/wiki/Serial_Programming/Forming_Data_Packets>, accessed on May 26, 2016.*
International Search Report, PCT International Patent Application No. PCT/EP2008/064131, dated Feb. 12, 2009.
Infineon: "TC1796 32-Bit Single-Chip Microcontroller TriCore," Internet Article, Sep. 2005, pp. 1-123 URL: ftp://ftp.efo.ru/pub/infineon/TC179_5 Fds_5Fv03.pdf.

* cited by examiner

COMMUNICATION SYSTEM HAVING A CAN BUS AND A METHOD FOR OPERATING SUCH A COMMUNICATION SYSTEM

FIELD OF THE INVENTION

The present invention relates to a communication system having a CAN bus and a method for operating a communication system having a CAN bus.

BACKGROUND INFORMATION

In data transmission, in particular transmission of CAN messages using a CAN bus, the protocol overhead of the physical protocol associated with the CAN bus amounts to approximately 55%, i.e., the header part of the particular CAN message is greater than its useful data part or payload part.

Furthermore, the maximum possible symbol rate of a CAN bus is currently limited to approximately 1 Mbaud due the physical boundary conditions and, in particular, due to asymmetric delays on the CAN bus.

SUMMARY

A communication system according to an example embodiment of the present invention and a method according to an example embodiment of the present invention for operating a communication system may have the advantage that the devices connected with the aid of the CAN bus are suitable for transmitting, over the CAN bus, CAN data frames in a first transmission mode and ASC (Asynchronous Serial Communication) data frames in a second transmission mode.

A particular advantage of example embodiments of the present invention is that the ASC data frames may be transmitted over the CAN bus at a higher bus clock pulse than the CAN data frames. Furthermore, the ASC data frames have a smaller header part compared to the CAN data frames and thus a larger useful data part or payload part. As a result, the symbol rate and the data transmission rate of the CAN bus according to the present invention is increased and maximized. The use of the present invention makes a symbol rate of 4 Mbaud and a reduction of the protocol overhead from 55% to 10% advantageously possible.

According to an example embodiment of the present invention, communication system has a CAN bus and at least two devices connected with the aid of the CAN bus. Such a device has a CAN control unit, an asynchronous, serial communication (ASC) interface unit, and a switch.

The particular example CAN control unit is suitable for transmitting, in a first transmission mode, CAN data frames over the CAN bus with the aid of a first physical protocol. The asynchronous, serial communication interface unit or ASC interface unit is suitable for transmitting, in a second transmission mode, ASC data frames over the CAN bus with the aid of a second physical protocol. The switch is designed for switching over between the first transmission mode and the second transmission mode as a function of at least one agreement effective between the particular device and at least one other device.

Furthermore, an example method for operating a communication system having a CAN bus and at least two devices connected with the aid of the CAN bus is provided, which includes the following steps:

a) Equipping the particular device with a CAN control unit which is suitable for transmitting, in a first transmission mode, CAN data frames over the CAN bus with the aid of a first physical protocol;

b) Equipping the particular device with an asynchronous, serial communication (ASC) interface unit, which is suitable for transmitting, in a second transmission mode, ASC data frames over the CAN bus with the aid of a second physical protocol; and c) Switching over a predefined number of devices between the first transmission mode and the second transmission mode as a function of at least one agreement effective between the predefined number of devices.

According to a preferred embodiment of the present invention, the agreement includes in which predefined time window(s) and/or as a function of which predefined event(s) the particular switch of a predefined number of devices switches into the first transmission mode or into the second transmission mode.

According to another preferred embodiment, the agreement specifies in which predefined time window(s) and/or as a function of which predefined event(s) the particular switch of a predefined number of devices switches into the second transmission mode and which of the devices has an exclusive transmission authorization in one or more of the subsequent time windows.

According to another preferred embodiment, the agreement is designed, at least partially, as part of a control program storable in the particular device and/or at least partially as part of an agreement message transmissible over the CAN bus.

According to another preferred refinement, in the second transmission mode, time windows, in which at least one particular device, a predefined number of devices, or all devices may transmit or receive, are predefined for the transmission of data frames, in particular as C data frames.

In particular, in the second transmission mode, time windows defined in TTCAN are predefined for the transmission of data frames. The configuration of the predefined time windows in the second transmission mode advantageously makes it possible to obtain guaranteed response times on the CAN bus.

According to another preferred embodiment, the agreement is configured as at least one time window defined in TTCAN or is integrated into at least one time window defined in TTCAN.

According to another preferred embodiment, the second transmission mode is prioritized with respect to the first transmission mode.

According to a preferred refinement of the present invention, a device transmitting in the second transmission mode is suitable with the aid of the second physical protocol to establish a point-to-point link or a point-to-multipoint link to a predefined number of receiving devices to prevent asymmetric delays on the CAN bus.

According to another preferred embodiment, the CAN control unit transmits the CAN data frames over the CAN bus in the first transmission mode using a first bus clock pulse and the ASC interface unit transmits the ASC data frames over the CAN bus in the second transmission mode using a second bus clock pulse, the second bus clock pulse being higher than the first bus clock pulse.

According to another preferred embodiment, the second bus clock pulse is higher than the first bus clock pulse by a factor of between 2 and 10, preferably between 5 and 10, particularly preferably between 8 and 10.

According to another preferred embodiment, a CAN data frame and an ASC data frame each have a header part and a useful data part, the header part of the ABC data frame being smaller than the header part of the CAN data frame.

According to another preferred embodiment, the header part of the ABC data frame is smaller than the header part of the CAN data frame by a factor of between 2 and 5, preferably between 3 and 5, particularly preferably between 4 and 5.

According to another preferred refinement, the at least two devices connected with the aid of the CAN bus include either a test device and at least one control device or at least two control devices.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
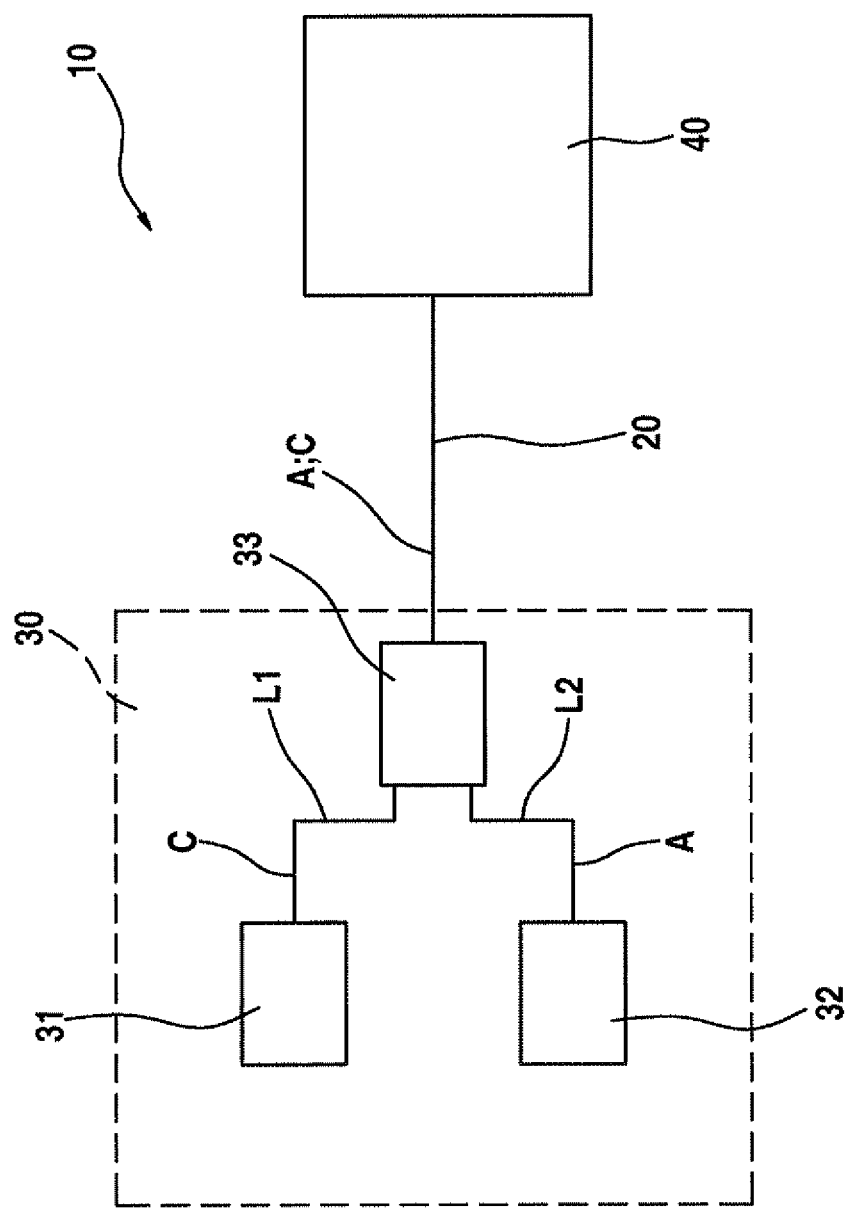
FIG. 1 shows a schematic block diagram of a first exemplary embodiment of a communication system according to the present invention.

In the figures, the same reference numerals identify the same components or components having the same function.

FIG. 1 shows a schematic block diagram of a first exemplary embodiment of a communication system 10 according to the present invention.

Communication system 10 has a CAN bus 20, at least two devices 30, 40 connected with the aid of CAN bus 20, and a switch 33.

The at least two devices 30, 40 connected with the aid of CAN bus 20 preferably include either a test device and at least one control device or at least two control devices. The test device is provided in a workshop for example. The control devices are preferably provided in a motor vehicle.

Figure 2:
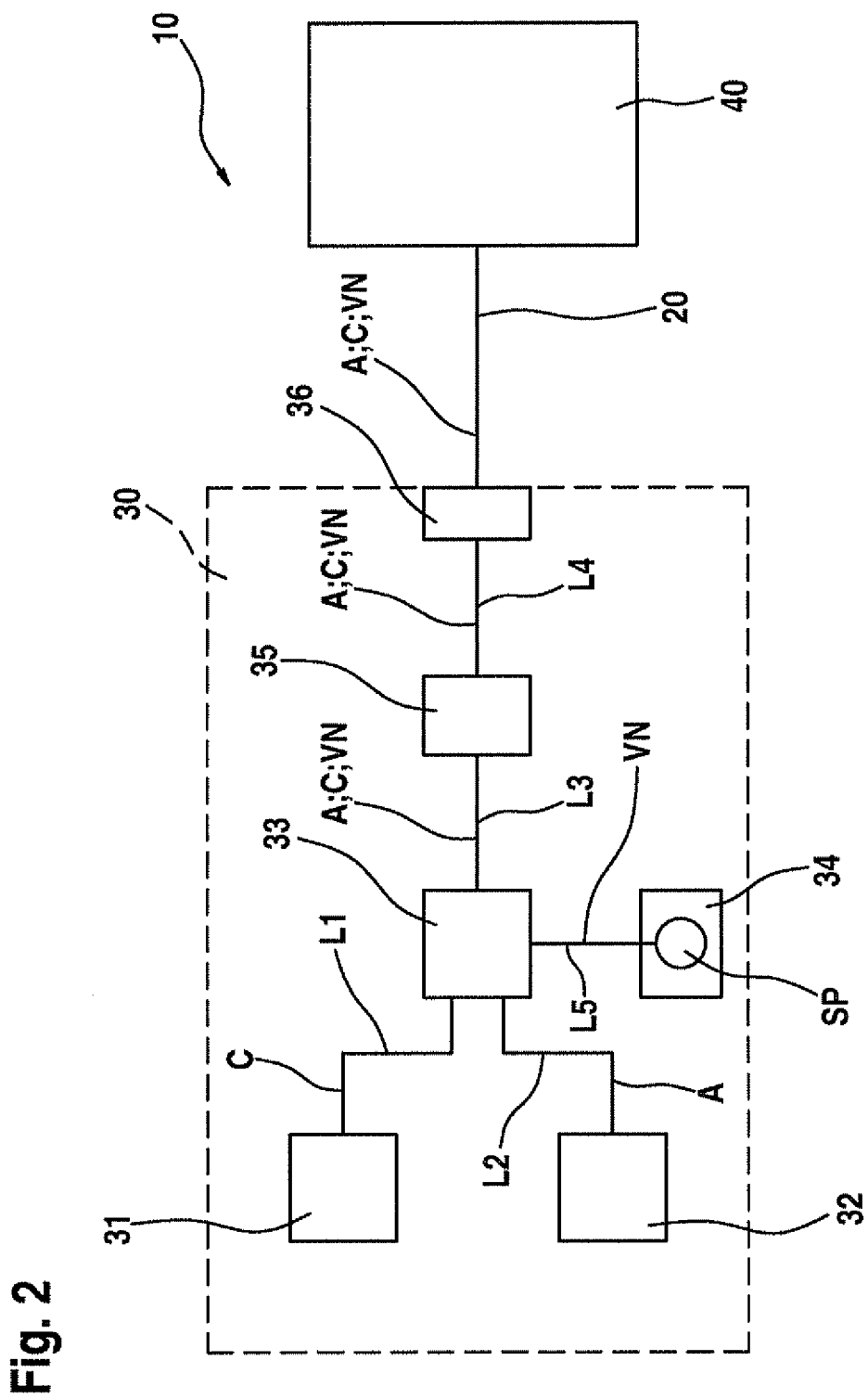
FIG. 2 shows a schematic block diagram of a second exemplary embodiment of a communication system according to the present invention.

In FIGS. 1 and 2, reference numerals 30 and 40 denote, for example, two control devices which have an identical design.

For the sake of clarity, only first control device 30 is elucidated in detail. However, basically the same applies to second control device 40.

First control device 30 has a CAN control unit 31, an asynchronous, serial communication (ASC) interface unit 32, and a switch 33. Switch 33 and CAN control unit 31 are connected with the aid of a first line L1. CAN control unit 31 is also designed for transmitting, in a first transmission mode, CAN data frames C over CAN bus 20 with the aid of a first physical protocol. For this purpose, CAN control unit 31 transmits CAN data frames C over first line L1 to switch 33, which may then transmit the received CAN data frames C to second control device 40 over CAN bus 20. Basically the same applies to the receiving direction to CAN control unit 31. Asynchronous serial communication (ABC) inter-face unit 32 or ASC interface unit 32 is connected to switch 33 with the aid of a second line L2. ABC interface unit 32 is designed to transmit, in a second transmission mode, ASC data frames A over CAN bus 20 with the aid of a second physical protocol. For this purpose, ABC interface unit 32 is connected to switch 33 via a second line L2 for transmitting ASC data frames A.

Switch 33 is designed for switching over between the first transmission mode and the second transmission mode as a function of at least one agreement V effective between first control device 30 and at least one other device, second control device 40 according to the example of FIGS. 1 and 2.

Agreement V preferably includes in which predefined time window(s) and/or as a function of which predefined event(s) the particular switch 33 of a predefined number of devices, for example, of the two control devices 30, 40 according to FIGS. 1 and 2, switches into the first transmission mode or into the second transmission mode.

Furthermore, agreement V specifies in which predefined time window(s) and/or as a function of which predefined event(s) the particular switch 33 of the two control devices 30, 40 switches into the second transmission mode and which of control devices 30, 40 has an exclusive transmission authorization in one or more of the subsequent time windows.

In particular, agreement V may be configured as at least one time window defined in TTCAN or integrated into at least one time window defined in TTCAN. TTCAN means "Time-Triggered Communication on CAN." TTCAN is established on the CAN bus and makes real-time control via higher protocol levels possible.

Furthermore, the second transmission mode is preferably prioritized with respect to the first transmission mode, i.e., the particular switch 33 will always switch into the second transmission mode according to a predefined specification, as long as the technical boundary conditions allow it.

Furthermore, a device transmitting in the second transmission mode, for example, first control device 30, is suitable or designed with the aid of the second physical protocol to establish a point-to-point link or a point-to-multipoint link to a predefined number of receiving devices, for example, second control device 40 and other control devices (not shown) to prevent asymmetric delays on CAN bus 20.

CAN control unit 31 preferably transmits CAN data frames C over CAN bus 20 in the first transmission mode using a first bus clock pulse. Furthermore, ASC interface unit 32 transmits ASC data frames A over CAN bus 20 in the second transmission mode using a second bus clock pulse, the second bus clock pulse being preferably higher than the first bus clock pulse. In particular, the second bus clock pulse is higher than the first bus clock pulse by a factor of between 2 and 10, preferably between 5 and 10, particularly preferably between 8 and 10.

FIG. 2 shows a schematic block diagram of a second exemplary embodiment of communication system 10 according to the present invention. The second exemplary embodiment of communication system 10 according to FIG. 2 differs from the first exemplary embodiment of communication system 10 according to FIG. 1 in particular in that a driver device 35 and an interface device or communication interface 36 are situated between bus system 20 and the particular switch 33. Driver device 35 is connected to switch 33 with the aid of a third line L3 and to interface device 36 with the aid of a fourth line L4. Interface device 36 is furthermore connected to second control device 40 and/or to other control devices (not shown) or to a test device (not shown) with the aid of CAN bus 20.

Driver device 35 is designed in particular as a CAN driver, which makes a bidirectional link to interface device 36 at the desired level possible.

Switch 33 is designed in particular as a program-controlled interface switch or also as a multiplexer, which makes switching over between CAN control unit 31 and ASC interface unit 32 possible. Furthermore, according to FIG. 2, agreement V may be designed, at least partially, as part of a control program SP storable in the particular device 30, 40, in the example of FIG. 2 in first control device 30, and/or at least partially as part of an agreement message VN transmissible over CAN bus 20. To store control program SP, a memory device 34 is integrated into particular control devices 30, for example. Memory device 34 is designed as a RAM or an EEPROM.

Figure 3A:
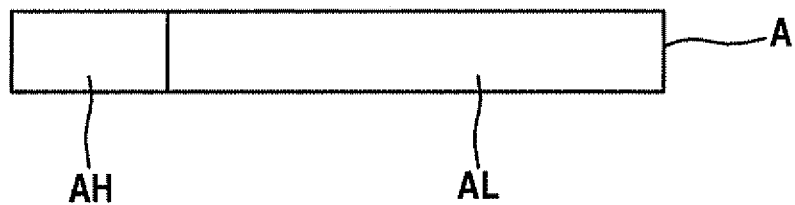
FIG. 3a shows a schematic block diagram of an exemplary embodiment of an ASC data frame.
Figure 3B:
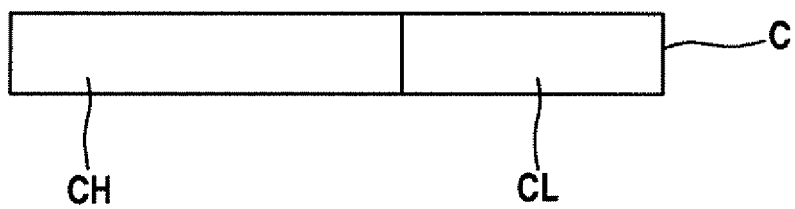
FIG. 3b shows a schematic block diagram of an exemplary embodiment of a CAN data frame.

FIG. 3a shows a schematic block diagram of an exemplary embodiment of an ABC data frame A, and FIG. 3b shows a schematic block diagram of an exemplary embodiment of a CAN data frame C. CAN data frame C and ASC data frame A each have a header part CH, AH and a useful data part CL, AL. Header part AH of ASC data frame A is smaller than header part CH of CAN data frame C. This makes it possible for useful data part AL of ASC data frame A to be greater than useful data part CL of CAN data frame C. Due to the enabled transmission of ABC data frames via CAN bus 20, this allows, according to the present invention, an increase in the data transmission rate.

Header part AH of ASC data frame A is smaller than header part CH of CAN data frame C by a factor of between 2 and 5, preferably between 3 and 5, particularly preferably between 4 and 5.

Figure 4:
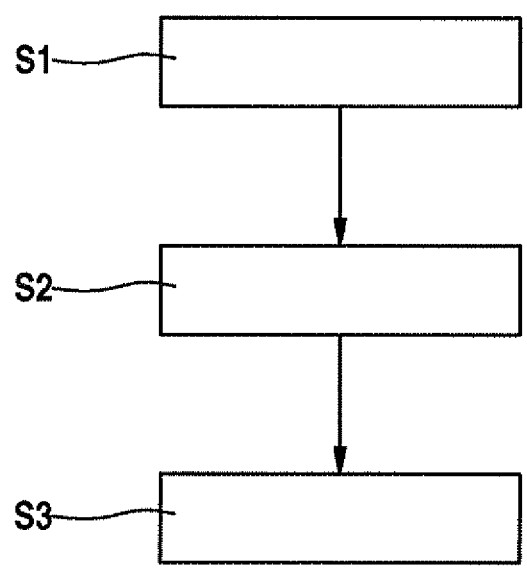
FIG. 4 shows a schematic flow chart of an exemplary embodiment of the method according to the present invention.

FIG. 4 shows a schematic flow chart of an exemplary embodiment of the method according to the present invention for operating a communication system 10 having a CAN bus 20, at least two devices 30, 40, control devices in particular, connected with the aid of CAN bus 20.

The method according to the present invention is described below with the aid of FIG. 4 and with reference to the schematic block diagram of FIG. 1. The exemplary embodiment of the method according to the present invention according to FIG. 4 has the following method steps S1 through S3:

Method Step S1:

The particular device 30, 40 is equipped with a CAN control unit 31. CAN control unit 31 is designed for transmitting, in a first transmission mode, CAN data frames C over CAN bus 20 with the aid of a first physical protocol.

Method Step S2:

Particular device 30, 40 is equipped with an asynchronous, serial communication (ASC) interface unit 32, which is designed for transmitting, in a second transmission mode, ASC data frames A over CAN bus 20 with the aid of a second physical protocol.

Method Step S3:

A predefined number of devices 30, 40 is switched over between the first transmission mode and the second transmission mode as a function of at least one of agreements V effective between the predefined number of devices 30, 40. Although the present invention has been described on the basis of preferred exemplary embodiments, it is not limited thereto, but may be modified in multiple ways. For example, it is possible to install the communication system according to the present invention not only in a motor vehicle, but also in an aircraft or in a spacecraft.

What is claimed is:

1. A communication system, comprising:
a CAN bus; and
at least two devices connected using the CAN bus, at least one of the at least two devices including:
 a) a CAN control unit configured to transmit, in a first transmission mode, CAN data frames over the CAN bus using a first physical protocol in a plurality of predefined TTCAN time windows occurring cyclically in a plurality of cycles;
 b) an asynchronous, serial communication (ASC) interface unit configured to transmit, in a second transmission mode, ASC data frames over the CAN bus using a second physical protocol; and
 c) a switch adapted to switch over between the first transmission mode and the second transmission mode as a function of an agreement, effective between the at least one of the at least two devices and at least one other of the at least two devices, of in which first predefined switching time window a predefined number of the devices switch from the first transmission mode to the second transmission mode and in which second predefined switching window the predefined number of the devices switch from the second transmission mode to the first transmission mode;
wherein:
 the first and second predefined switching time windows occur cyclically according to the plurality of cycles in which the TTCAN time windows cyclically occur; and
 the CAN control unit is configured to transmit the CAN data frames over the CAN bus in the first transmission mode using a first bus clock pulse, and the ASC interface unit is configured to transmit the ASC data frames over the CAN bus in the second transmission mode using a second bus clock pulse, the second bus clock pulse being higher than the first bus clock pulse.

2. The method as recited in claim 1, wherein the agreement specifies which of the devices has an exclusive transmission authorization in one or more of the subsequent time windows following the switch into the second transmission mode.

3. The communication system as recited in claim 1, wherein the second bus clock pulse is higher than the first bus clock pulse by a factor of between 2 and 10.

4. The communication system as recited in claim 3, wherein the factor is between 5 and 10.

5. The communication system as recited in claim 3, wherein the factor is between 8 and 10.

6. The communication system as recited in claim 1, wherein a CAN data frame and an ASC data frame each have a header part and a useful data part, the header part of the ASC data frame being smaller than the header part of the CAN data frame.

7. The communication system as recited in claim 6, wherein the header part of the ASC data frame is smaller than the header part of the CAN data frame by a factor of between 2 and 5.

8. The communication system as recited in claim 7, wherein the factor is between 3 and 5.

9. The communication system as recited in claim 7, wherein the factor is between 4 and 5.

10. The communication system as recited in claim 1, wherein the at least two devices connected using the CAN bus include: i) a test device and at least one control device, or ii) at least two control devices.

11. A method for operating a communication system having a CAN bus and at least two devices using the CAN bus, comprising:
   a) equipping at least one of the devices with a CAN control unit which is suitable for transmitting, in a first transmission mode, CAN data frames over the CAN bus using a first physical protocol in a plurality of predefined TTCAN time windows occurring cyclically in a plurality of cycles;
   b) equipping at least one of the devices with an asynchronous, serial communication (ASC) interface unit, which is suitable for transmitting, in a second transmission mode, ASC data frames over the CAN bus using a second physical protocol; and
   c) switching over a predefined number of devices between the first transmission mode and the second transmission mode as a function of an agreement, effective between the predefined number of devices, of in which first predefined switching time window the predefined number of the devices switch from the first transmission mode to the second transmission mode and in which second predefined switching window the predefined number of the devices switch from the second transmission mode to the first transmission mode, wherein the first and second predefined switching time windows occur cyclically according to the plurality of cycles in which the TTCAN time windows cyclically occur.

12. The method as recited in claim 11, wherein the agreement is, at least partially, part of a control program storable in at least one of the devices.

13. The method as recited in claim 11, wherein the agreement is, at least partially, a part of an agreement message transmissible over the CAN bus.

14. The method as recited in claim 11, wherein the second transmission mode is prioritized with respect to the first transmission mode.

15. The method as recited in claim 11, wherein a device transmitting in the second transmission mode is suitable using the second physical protocol to establish a point-to-point link or a point-to-multipoint link to a predefined number of receiving devices to prevent asymmetric delays on the CAN bus.

16. The method as recited in claim 11, wherein, in the second transmission mode, time windows in which at least one of the devices or the predefined number of the devices may transmit or receive are predefined for the transmission of ASC data frames.

17. The method as recited in claim 11, wherein the agreement specifies which of the devices has an exclusive transmission authorization in one or more of the subsequent time windows following the switch into the second transmission mode.

18. A communications method comprising:
   switching, by a switching circuit, a first device between a first transmission mode and a second transmission mode as a function of an agreement, effective between the first device and a second device, of in which first predefined switching time window the first device switches from the first transmission mode to the second transmission mode and in which second predefined switching window the first device switches from the second transmission mode to the first transmission mode;
   wherein the first device is configured such that:
      when transmitting in the first transmission mode, a CAN control unit of the first device transmits CAN data frames over a CAN bus using a first bus clock pulse in a plurality of predefined TTCAN time windows occurring cyclically in a plurality of cycles, according to which cycles the first and second predefined switching time windows cyclically occur; and
      when transmitting in the second transmission mode, an asynchronous, serial communication (ASC) interface unit of the first device transmits ASC data frames over the CAN bus using a second bus clock pulse that is higher than the first bus clock pulse.

19. The method as recited in claim 18, wherein the agreement specifies which of the devices has an exclusive transmission authorization in one or more of the subsequent time windows following the switch into the second transmission mode.

* * * * *